(12) United States Patent
Fujita et al.

(10) Patent No.: US 7,911,770 B2
(45) Date of Patent: Mar. 22, 2011

(54) GAS INSULATED SWITCHGEAR

(75) Inventors: Daisuke Fujita, Tokyo (JP); Takuya Otsuka, Tokyo (JP); Hitoshi Sadakuni, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/532,848

(22) PCT Filed: May 11, 2007

(86) PCT No.: PCT/JP2007/059720
§ 371 (c)(1),
(2), (4) Date: Sep. 24, 2009

(87) PCT Pub. No.: WO2008/139592
PCT Pub. Date: Nov. 20, 2008

(65) Prior Publication Data
US 2010/0118472 A1 May 13, 2010

(51) Int. Cl.
*H02B 5/00* (2006.01)
(52) U.S. Cl. .......................... 361/612; 361/604
(58) Field of Classification Search .......... 361/604, 361/612, 619, 620
See application file for complete search history.

(56) References Cited

U.S. PATENT DOCUMENTS

| | | | |
|---|---|---|---|
| 5,140,499 A | 8/1992 | Amano et al. | |
| 5,373,415 A * | 12/1994 | Tawaratani | 361/612 |
| 5,559,669 A * | 9/1996 | Inami et al. | 361/612 |
| 5,578,804 A * | 11/1996 | Berger et al. | 218/43 |
| 5,757,614 A * | 5/1998 | Hachida et al. | 361/602 |
| 5,991,148 A * | 11/1999 | Heil et al. | 361/605 |
| 6,469,270 B1 * | 10/2002 | Omori et al. | 218/7 |
| 6,614,648 B2 * | 9/2003 | Yamane et al. | 361/612 |
| 6,727,454 B2 * | 4/2004 | Okabe et al. | 218/43 |
| 7,236,351 B2 * | 6/2007 | Chavot et al. | 361/604 |
| 7,391,605 B2 * | 6/2008 | Sologuren-Sanchez et al. | 361/612 |
| 7,414,827 B2 * | 8/2008 | Kashiwa et al. | 361/612 |
| 7,515,398 B2 * | 4/2009 | Takao et al. | 361/612 |

FOREIGN PATENT DOCUMENTS

| | | |
|---|---|---|
| JP | 60-005216 U | 1/1985 |
| JP | 63-202032 U | 12/1988 |
| JP | 64-012439 A | 1/1989 |
| JP | 01-185108 A | 7/1989 |
| JP | 01-255409 A | 10/1989 |
| JP | 04-058705 A | 2/1992 |

(Continued)

OTHER PUBLICATIONS

*International Search Report (PCT/ISA/210) for PCT/JP2007/059720 mailed Aug. 14, 2007.

(Continued)

*Primary Examiner* — Boris L Chervinsky
(74) *Attorney, Agent, or Firm* — Buchanan Ingersoll & Rooney PC

(57) ABSTRACT

A power transmission/reception line circuit breaker includes a vertical-type first circuit breaker tank and a plurality of branch lead-out ports arranged at an interval H. A busbar-side device is connected to each branch lead-out port other than an uppermost branch lead-out port to which a line-side device is connected and a busbar. A busbar link line circuit breaker includes a vertical-type second circuit breaker tank having a length shorter than that of the first circuit breaker tank by the interval H and a plurality of branch lead-out ports arranged at the interval H. A busbar-side device is connected to each of the branch lead-out ports.

18 Claims, 15 Drawing Sheets

| FOREIGN PATENT DOCUMENTS | | |
|---|---|---|
| JP | 06-311612 A | 11/1994 |
| JP | 07-193925 A | 7/1995 |
| JP | 2736110 B2 | 1/1998 |
| JP | 63-069406 A | 3/1998 |
| JP | 11-089028 A | 3/1999 |

OTHER PUBLICATIONS

*Written Opinion (PCT/ISA/237) for PCT/JP2007/059720 mailed Aug. 14, 2007.

* cited by examiner

GAS INSULATED SWITCHGEAR

TECHNICAL FIELD

The present invention relates to a gas insulated switchgear that includes a circuit breaker having a plurality of branch lead-out ports provided on the lateral side of a circuit breaker tank.

BACKGROUND ART

A gas insulated switchgear that is used in a substation, a power station, or the like is classified into various units according to applications for a power transmission/reception line, a transformer line, a busbar link line, or a busbar section line. Therefore, it is preferable to standardize a common part of these units and share the common part than to individually design and manufacture these units.

Patent Document 1 discloses a double-bus-system gas insulated switchgear that provides three branch lead-out ports on the lateral side of a vertical-type circuit breaker tank and appropriately change devices to be connected to the three branch lead-out ports to be used for both of a power transmission/reception line and a busbar link line. In the case of a configuration of a power transmission/reception line unit, one of the branch lead-out ports is connected to a line-side device and each of the other two branch lead-out ports is connected to a busbar-side device. In the case of a configuration of a busbar link line unit, a branch lead-out port connected to a line-side device is blocked up by a blocking board, branch lead-out ports connected to busbar-side devices are respectively connected to disconnect switches of which each is integral with a busbar and has a ground switch, and a conductor derived from a breaking unit within the circuit breaker tank is connected to two busbars that are arranged up and down.

Patent Document 1 also discloses a configuration that a current transformer is located only at the upper side of the vertical-type circuit breaker tank. In other words, Patent Document 1 discloses the configuration of a one-side current transformer in which a current transformer is provided only at one side of the circuit breaker.

Patent Document 2 discloses a gas insulated switchgear including a breaking unit that is provided inside a vertical-type circuit breaker tank, a busbar that is coupled to the lateral side of the circuit breaker tank, and a busbar-connection conductor that is provided in the circuit breaker tank and connects the busbar and the breaking unit. One end of the busbar-connection conductor is connected to a lower end of the breaking unit and the other end of the busbar-connection conductor is provided to be folded at an upper end of the breaking unit. Furthermore, the busbar-connection conductor is provided to be inclined and thus is away from the breaking unit as the conductor is extended upward.

Patent Document 1: Japanese Patent No. 2736110 Patent Document 2: Japanese Patent Application Laid-open No. H4-58705

DISCLOSURE OF INVENTION

Problem to be Solved by the Invention

However, the gas insulated switchgear disclosed in Patent Document 1 has the following problem. When the power transmission/reception line unit is used as the busbar link line unit, one of the branch lead-out ports is blocked by the blocking board and the conductor derived from the breaking unit is folded within the circuit breaker tank to directly connect the busbars that are arranged up and down. Therefore, in addition to the cost of the blocking board, the manufacturing cost of the conductor increases because the connecting length of the conductor gets longer.

Because a folding structure of the conductor is present inside the circuit breaker tank, a diameter of the circuit breaker tank necessarily becomes large for the sake of the securement of an insulation distance between the conductor and the circuit breaker tank and thus an installation area increases.

Although the current transformer is provided only at one side of the circuit breaker in Patent Document 1, the current transformers are actually provided at both sides of the circuit breaker in many cases. When a technique disclosed in Patent Document 1 is applied to a configuration of both-side current transformers, the width of the unit also increases because another current transformer is provided between the branch lead-out port connected to the lower busbar and the breaking unit, in addition to the increase of the height of the unit due to the presence of the current transformer provided at the upper side of the circuit breaker tank. In this manner, an installation space increases because the dimension of unit increases in two directions of the height of unit and the length of unit.

Moreover, even in Patent Document 2, because a folding structure of the busbar-connection conductor is present inside the circuit breaker tank, a structure inside the circuit breaker is complicated even if the busbar-connection conductor is inclined. Therefore, it is still difficult to thin the circuit breaker tank.

The present invention has been achieved in view of the above problems, and an object of the invention is to provide a gas insulated switchgear including a vertical-type circuit breaker in which a plurality of branch lead-out ports are provided. In this case, the connecting structure of a conductor connected to a breaking unit provided in a circuit breaker tank can be simplified, the circuit breaker tank can be thinned, and the length of unit can be shortened even when current transformers are provided at both sides of the circuit breaker.

Means for Solving Problem

To solve the above problems and to achieve the object, a gas insulated switchgear of multi-busbar system according to the present invention includes a circuit breaker for power transmission/reception line including a vertical-type circuit breaker tank and a plurality of branch lead-out ports provided on a lateral side of the circuit breaker tank and arranged at regular intervals (an interval H) along a longitudinal direction of the circuit breaker tank; a busbar-side device for power transmission/reception line connected to each of branch lead-out ports other than an uppermost branch lead-out port among the plurality of branch lead-out ports provided in the circuit breaker for power transmission/reception line and a busbar; a line-side device connected to the uppermost branch lead-out port and arranged in opposite to the circuit breaker for power transmission/reception line across the busbar; a circuit breaker for busbar link line including a vertical-type circuit breaker tank having a length shorter than that of the circuit breaker tank of the circuit breaker for power transmission/reception line by the interval H and a plurality of branch lead-out ports provided on a lateral side of the circuit breaker tank and arranged at regular intervals with the interval H along a longitudinal direction of the circuit breaker tank; and a busbar-side device for busbar link line connected to each of branch lead-out ports provided in the circuit breaker for busbar link line and the busbar.

Effect of the Invention

According to the present invention, a plurality of branch lead-out ports are mutually provided at regular intervals (interval H) in a circuit breaker tank of a power transmission/reception line circuit breaker. The length of a circuit breaker tank of a busbar link line circuit breaker is, by the interval H, shorter than the length of the circuit breaker tank of the power transmission/reception line circuit breaker. Similarly, a plurality of branch lead-out ports are mutually provided at regular intervals (interval H) in the circuit breaker tank of the busbar link line circuit breaker. Because a power transmission/reception line and a busbar link line are constituted by using these circuit breakers, a connecting structure of a conductor connected to a breaking unit within the circuit breaker tank can be simplified, the circuit breaker and the multiple busbars can be connected without the folding structures of the conductor, and the circuit breaker tank can be thinned.

Moreover, because the length of the circuit breaker tank of the busbar link line circuit breaker is reduced, an installation space and a manufacturing cost are reduced.

Moreover, because the power transmission/reception line circuit breaker and the line-side device are facing each other while placing the multiple busbars therebetween, the length of unit in a direction heading from the power transmission/reception line circuit breaker to the line-side device can be shortened and thus an installation space can be reduced.

Moreover, by defining the length of the circuit breaker tank of the power transmission/reception line circuit breaker and the length of the circuit breaker tank of the busbar link line circuit breaker, the length of the circuit breaker tank can be standardized for a plurality of line configurations.

BRIEF DESCRIPTION OF DRAWINGS

FIG. 4-1 is a plan view illustrating an example of an entire layout of a substation that is obtained by applying the first embodiment and is a diagram illustrating a busbar section line unit.

FIG. 4-2 is a front view of the configuration shown in FIG. 4-1.

FIG. 12-1 is a plan view illustrating an example of an entire layout of a substation that is obtained by applying the second embodiment.

FIG. 12-2 is a front view of the configuration shown in FIG. 12-1.

EXPLANATIONS OF LETTERS OR NUMERALS

Figure 1:
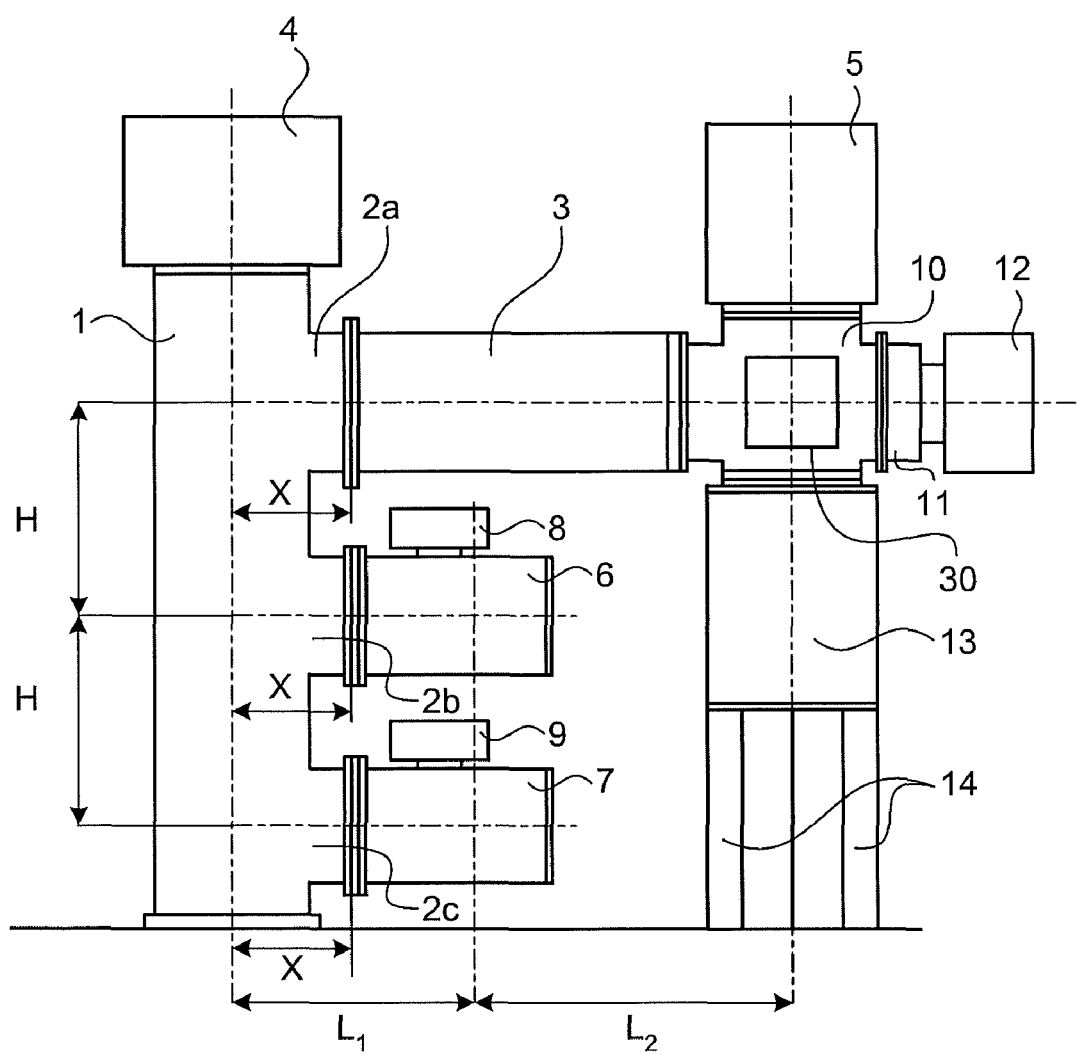
FIG. 1 is a cross-sectional view illustrating a configuration of a gas insulated switchgear according to a first embodiment and is a diagram illustrating a power transmission/reception line unit.

1, 16 circuit breaker
2*a*, 2*b*, 2*c*, 15*a*, 15*b* branch lead-out port
3, 18, 19 current transformer
5 voltage transformer
6, 7, 10, 20, 22 disconnect switch
4, 8, 9, 12, 17, 21, 23, 30, 50, 90, 91, 92 operating device
11, 24 ground switch
13 cable head
14 supporting base
28 upper busbar
29 lower busbar
95 breaking unit
96 line-connection conductor
97 busbar-connection conductor

BEST MODE(S) FOR CARRYING OUT THE INVENTION

Exemplary embodiments of a gas insulated switchgear according to the present invention will be explained below in detail with reference to the accompanying drawings. The present invention is not limited to the embodiments explained below.

First Embodiment

Figure 2:
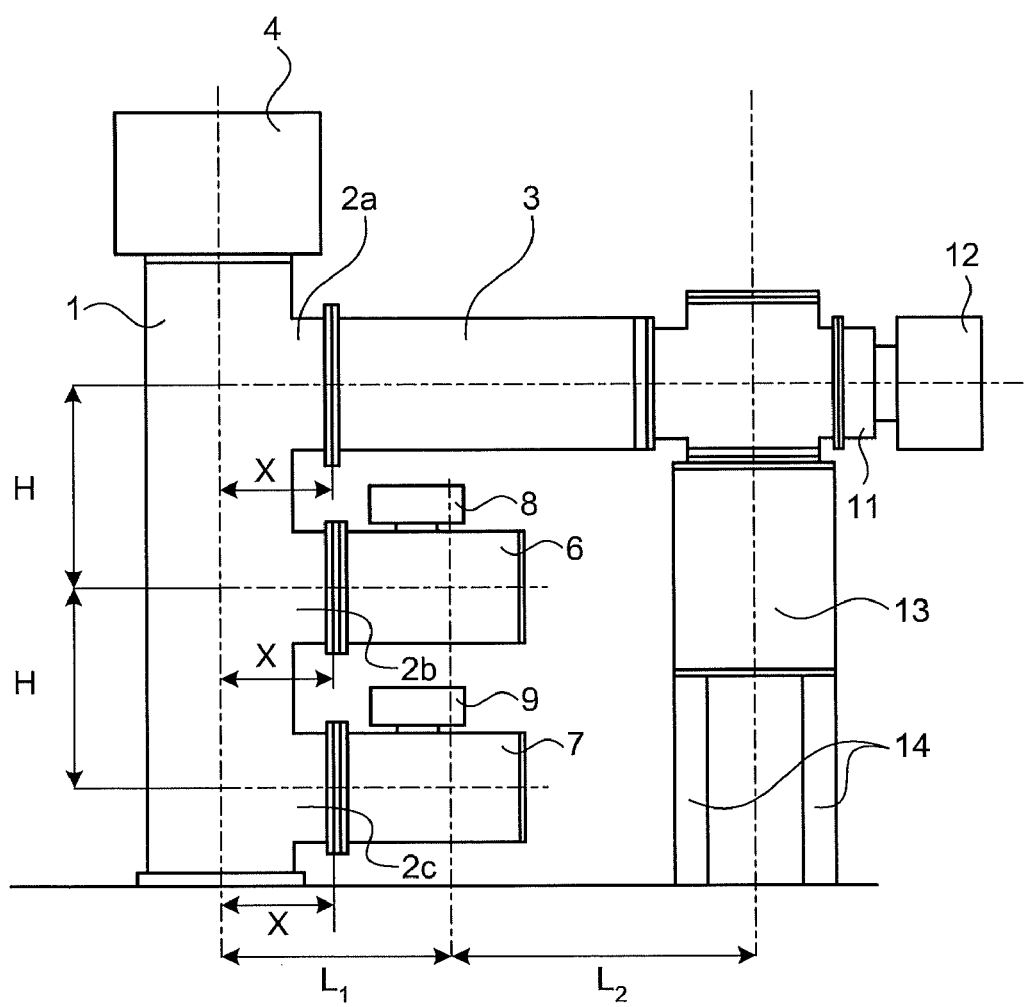
FIG. 2 is a cross-sectional view illustrating a configuration of the gas insulated switchgear according to the first embodiment and is a diagram illustrating a transformer-line unit that is another configuration of the power transmission/reception line unit.
Figure 3:
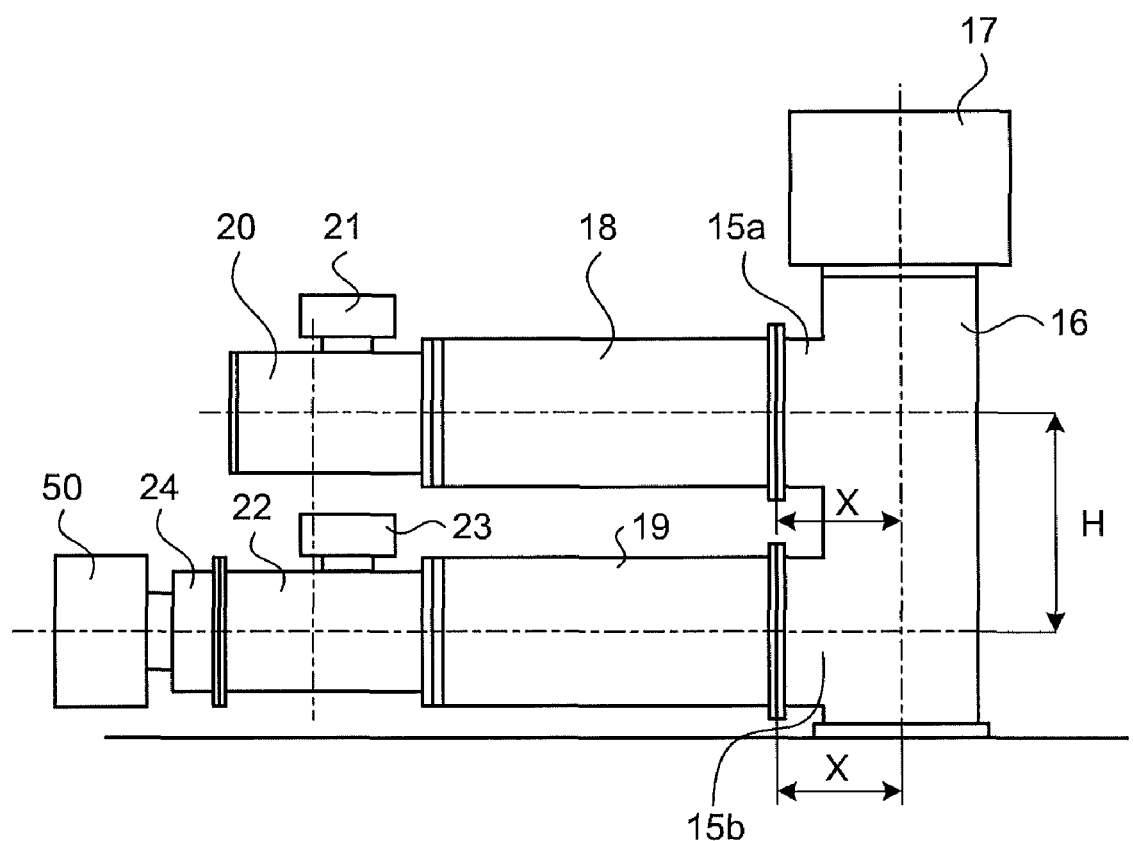
FIG. 3 is a cross-sectional view illustrating a configuration of the gas insulated switchgear according to the first embodiment and is a diagram illustrating a busbar link line unit.

FIG. 1 is a cross-sectional view illustrating a configuration of a gas insulated switchgear according to a first embodiment and is a diagram illustrating a power transmission/reception line unit. FIG. 2 is a diagram illustrating a transformer-line unit that is another configuration of the power transmission/reception line unit according to the first embodiment. FIG. 3 is a cross-sectional view illustrating a configuration of the gas insulated switchgear according to the first embodiment and is a diagram illustrating a busbar link line unit.

As shown in FIG. 1, the gas insulated switchgear includes a circuit breaker 1 having a breaking unit inside a cylindrical tank in which insulating gas is sealed. The circuit breaker 1 is a vertical-type circuit breaker in which a central-axis direction of the tank is perpendicular to an installation surface. The gas insulated switchgear further includes an operating device 4 that is located at the upper side of the tank of the circuit breaker 1 and operates the circuit breaker 1.

A plurality of branch lead-out ports are provided on the lateral side of the tank of the circuit breaker 1. As an example, three branch lead-out ports 2a, 2b, and 2c are provided along a direction parallel to the central-axis direction of the tank from the upper portion to the lower portion of the tank. For example, intervals between adjacent branch lead-out ports among the three branch lead-out ports 2a, 2b, and 2c are the same as an interval H. Moreover, as an example, distances along the diametrical direction of the tank from the central axis of the tank to leading ends of the branch lead-out ports are the same as a distance X. A line-side device is connected to the branch lead-out port 2a and busbar-side devices are respectively connected to the branch lead-out ports 2b and 2c.

A disconnect switch 7 not having a ground switch is connected to the branch lead-out port 2c. The disconnect switch 7 constitutes a disconnect switch integral with a busbar. An operating device 9 for operating a device is provided on the upper side of the disconnect switch 7. A disconnect switch 6 having a ground switch is connected to the branch lead-out port 2b that is provided on the upper side of the branch lead-out port 2c. The disconnect switch 6 constitutes a disconnect switch integral with a busbar. An operating device 8 for operating a device is provided on the upper side of the disconnect switch 6. The present embodiment employs a multi-busbar system. The disconnect switches 6 and 7 are respectively connected to upper and lower busbars that are extended in a direction perpendicular to the drawing (not shown). Moreover, the branch lead-out port 2a that is provided on the upper side of the branch lead-out port 2b is connected to a current transformer 3.

The gas insulated switchgear further includes a cable head 13, a disconnect switch 10, an operating device 30, a voltage transformer 5, a ground switch 11, and an operating device 12, so as to face the circuit breaker 1 while placing the two busbars therebetween. The cable head 13 is provided on a supporting base 14. The disconnect switch 10 has a ground switch and is connected to the cable head 13. The operating device 30 operates the disconnect switch 10. The voltage transformer 5 is provided on the disconnect switch 10. The ground switch 11 for line-side ground is connected to the disconnect switch 10. The operating device 12 operates the ground switch 11. Moreover, the branch lead-out port 2a and the disconnect switch 10 are connected via the current transformer 3.

In FIG. 1, a distance $L_1$ from the central axis of the circuit breaker 1 to the central axis of the busbar penetrating the disconnect switch 6 or 7 is shorter than a distance $L_2$ from the central axis of the busbar penetrating the disconnect switch 6 or 7 to the central axis of the cable head 13. Therefore, a space between the busbar-side devices and the line-side devices (particularly, the cable head 13 and the supporting base 14 for supporting the cable head) is formed.

Next, a configuration of the transformer-line unit according to the present embodiment will be explained with reference to FIG. 2. As shown in FIG. 2, the configuration of the transformer-line unit of the present embodiment is the same as that of the power transmission/reception line unit shown in FIG. 1, except that the voltage transformer 5, the disconnect switch 10, and the operating device 30 shown in FIG. 1 are not provided. Therefore, in FIG. 2, the components that have the same functions as those of the components shown in FIG. 1 are denoted by the same reference numbers, and the explanations thereof are omitted.

Next, a configuration of the busbar link line unit will be explained with reference to FIG. 3. The busbar link line unit is used to connect the busbars between each other and temporarily switch a power system. As shown in FIG. 3, the gas insulated switchgear includes a circuit breaker 16 having a breaking unit inside a cylindrical tank in which insulating gas is sealed. The circuit breaker 16 is a vertical-type circuit breaker in which a central-axis direction of the tank is perpendicular to an installation surface. The gas insulated switchgear further includes an operating device 17 that is located at the upper side of the tank of the circuit breaker 16 and operates the circuit breaker 16.

Two branch lead-out ports 15a and 15b are provided on the later side of the tank of the circuit breaker 16. The branch lead-out ports 15a and 15b are provided along a direction parallel to the central-axis direction of the tank. An interval between the branch lead-out ports is the interval H similarly to that of FIG. 1. The branch lead-out port 15a is provided on the upper side of the branch lead-out port 15b. Distances along a diametrical direction of the tank from the central axis of the tank of the circuit breaker 16 to the leading ends of the branch lead-out ports are the distance X similarly to that of FIG. 1. Compared to the tank of the circuit breaker 1 shown in FIG. 1, the length (in the central-axis direction) of the tank of the circuit breaker 16 shown in FIG. 3 gets short by one pitch, in other words, by the interval H. Busbar-side devices are respectively connected to the branch lead-out ports 15a and 15b.

The branch lead-out port 15b is connected to a current transformer 19. The current transformer 19 is connected to a disconnect switch 22 having a ground switch. The disconnect switch 22 constitutes a disconnect switch integral with a busbar. An operating device 23 for operating a device is provided on the upper side of the disconnect switch 22. A ground switch 24 for busbar ground and an operating device 50 for operating the ground switch 24 are provided at the other side (the side opposite to the connection side of the current transformer 19) of the disconnect switch 22. In this case, the current transformer 19, the disconnect switch 22, the ground switch 24, and the operating device 50 are connected to each other in a direction perpendicular to the central axis of the tank of the circuit breaker 16. The branch lead-out port 15a is connected to a current transformer 18. The current transformer 18 is connected to a disconnect switch 20 having a ground switch. The disconnect switch 20 constitutes a disconnect switch integral with a busbar. An operating device 21 for operating a device is provided on the upper side of the disconnect switch 20. In this case, the current transformer 18 and the disconnect switch 20 are connected to each other in a direction perpendicular to the central axis of the tank of the circuit breaker 16. Moreover, upper and lower busbars are respectively extended from the disconnect switches 20 and 22 in a direction perpendicular to the drawing (not shown). In this manner, the busbar link line unit according to the present embodiment includes two current transformers, namely, the current transformers 18 and 19 in the tank of the circuit breaker 16.

Figures 1, 4:
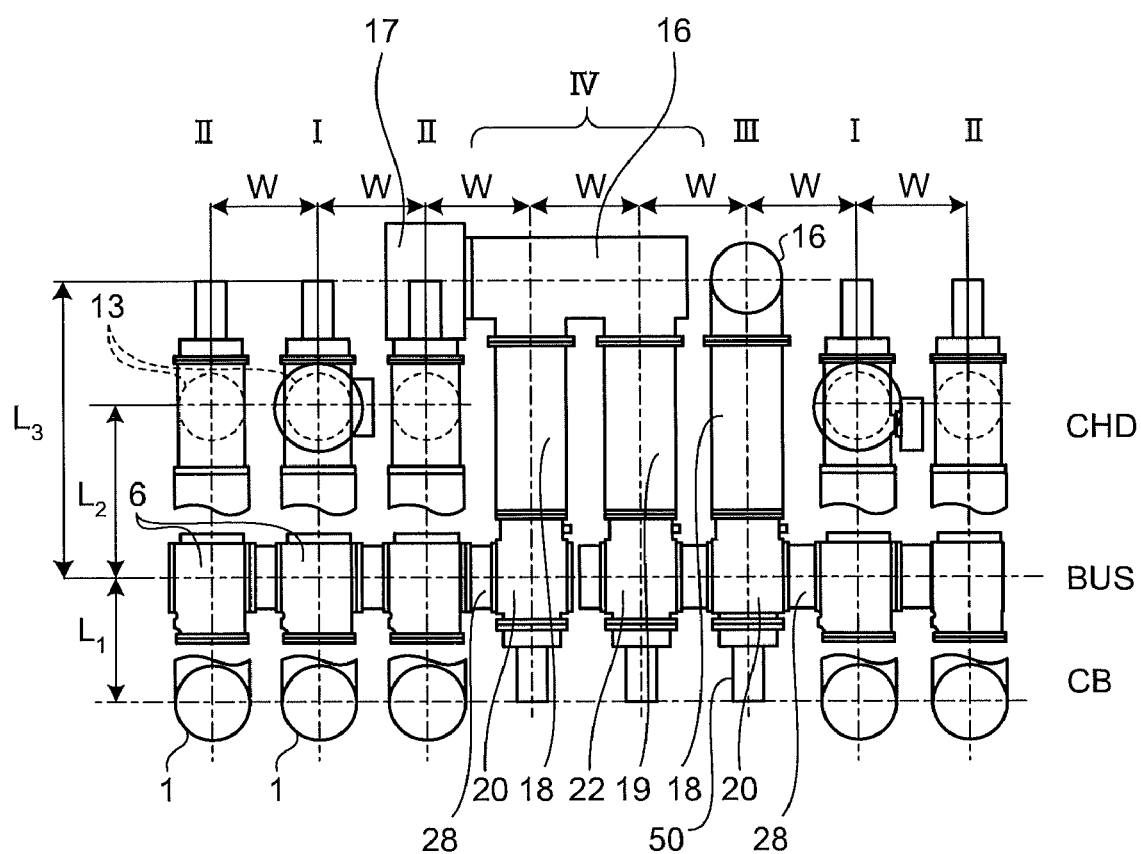
Figures 2, 4:
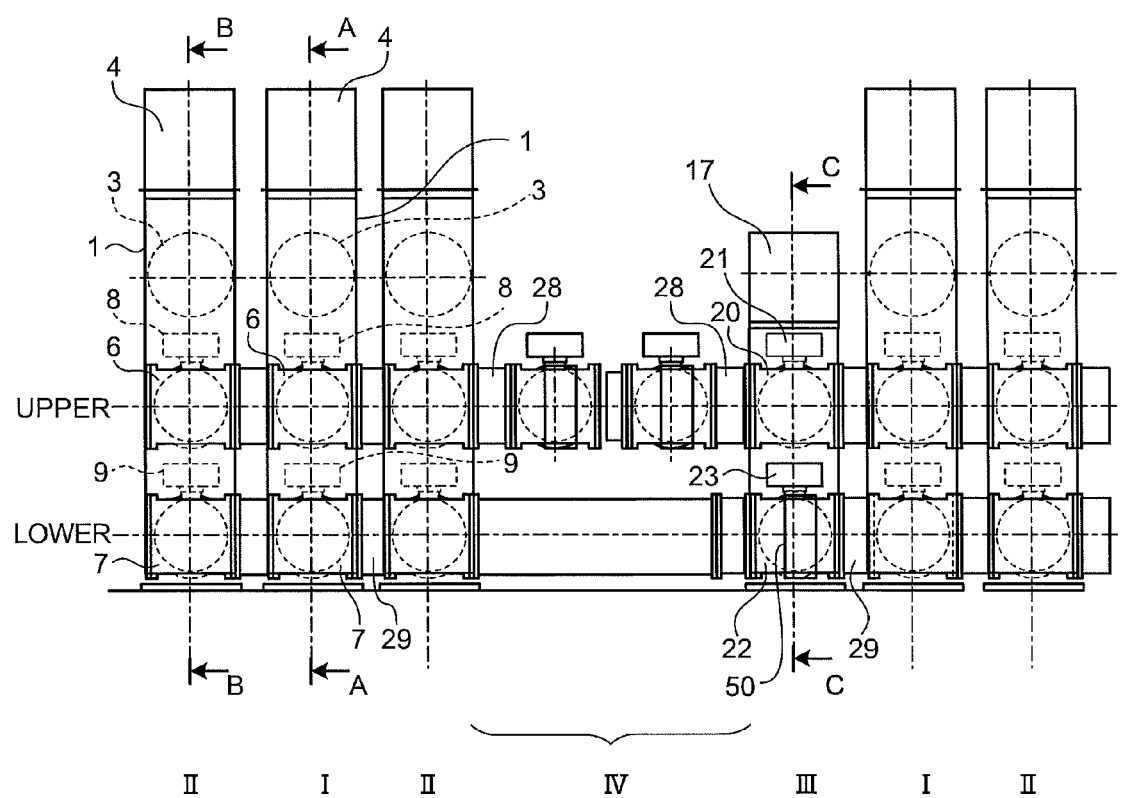

FIG. 4-1 is a plan view illustrating an example of an entire layout of a substation that is obtained by applying the first embodiment and is a diagram illustrating a busbar section line unit. FIG. 4-2 is a front view of the configuration shown in FIG. 4-1. In FIG. 4-1 and FIG. 4-2, the power transmission/reception line unit shown in FIG. 1 is denoted by I, the transformer-line unit shown in FIG. 2 is denoted by II, the busbar link line unit shown in FIG. 3 is denoted by III, and a busbar section line unit to be described below is denoted by IV. Moreover, in FIG. 4-2, an A-A line indicates the cross section shown in FIG. 1, a B-B line indicates the cross section shown in FIG. 2, and a C-C line indicates the cross section shown in FIG. 3. The plan view of FIG. 4-1 is a plane obtained by horizontally cutting the disconnect switch 6 shown in FIG.

1. In FIG. 4-1 and FIG. 4-2, the components that have the same functions as those of the components shown in FIGS. 1 to 3 are denoted by the same reference numbers.

As shown in FIG. 4-1 and FIG. 4-2, the transformer-line unit (II), the power transmission/reception line unit (I), the transformer-line unit (II), and the busbar section line unit (IV) are arranged from left to right in sequence in the present drawing. The transformer-line unit (II), the power transmission/reception line unit (I), and the transformer-line unit (II) are connected to each other through an upper busbar 28 and a lower busbar 29 that are respectively extended in a horizontal direction. For example, on the extreme left of the drawing, the disconnect switch 6 of the transformer-line unit (II) is connected to the upper busbar 28 and the disconnect switch 7 is connected to the lower busbar 29.

Furthermore, to the right from the busbar section line unit (IV), the busbar link line unit (III), the power transmission/reception line unit (I), and the transformer-line unit (II) are arranged sequentially. The busbar link line unit (III), the power transmission/reception line unit (I), and the transformer-line unit (II) are connected to each other through the upper busbar 28 and the lower busbar 29 that are respectively extended in a horizontal direction.

As shown in FIG. 4-1, the circuit breaker 16 of the busbar link line unit (III) is provided to face the circuit breaker 1 of the power transmission/reception line unit (I) and the transformer-line unit (II) while placing the upper and lower busbars therebetween. In other words, the branch lead-out ports provided in the circuit breaker 16 of the busbar link line unit (III) are arranged to face the branch lead-out ports provided in the circuit breaker 1 of the power transmission/reception line unit (I) or the transformer-line unit (II). In regard to the busbar link line unit (III), the current transformer 18 connected to the circuit breaker 16 and the disconnect switch 20 connected to the current transformer 18 and the upper busbar 28 are illustrated in FIG. 4-1. In addition, the operating device 50 in the busbar link line unit (III) is connected to the lower busbar 29 (see FIG. 3). A distance $L_3$, in a longitudinal direction of the current transformer 18, between the central axis of the tank of the circuit breaker 16 and the central axis of the upper and lower busbars in the busbar link line unit (III) is longer than the $L_2$. Therefore, the circuit breaker 16 in the busbar link line unit (III) is arranged outer the line-side device provided in the power transmission/reception line unit (I) or the transformer-line unit (II). However, in the case of the busbar link line, it is not necessarily required that $L_3 > L_2$. Therefore, the equation can be $L_3 = L_2$ or $L_3 < L_2$. In other words, depending on the dimension of an entire length determined from a design specification of the current transformer of the busbar link line, the equation can be $L_3 = L_2$ or $L_3 < L_2$. However, as described below, a merit of standardization is obtained by adapting the position of the circuit breaker of the busbar link line to the position of the circuit breaker of a busbar section line.

Next, the busbar section line unit (IV) will be explained. As shown in FIG. 4-1 and FIG. 4-2, in the busbar section line unit (IV), the circuit breaker 16 including two branch lead-out ports is arranged on the same horizontal surface as that of the upper busbar 28 that is sectioned. The shape of the tank of the circuit breaker in the busbar section line unit (IV) is the same as that of the tank of the circuit breaker in the busbar link line unit (III). The two branch lead-out ports of the circuit breaker 16 are respectively connected to the current transformers 18 and 19. The disconnect switch 20 connected to the current transformer 18 is connected to the adjacent transformer-line unit (II) via the upper busbar 28. The disconnect switch 22 connected to the current transformer 19 is connected to the adjacent busbar link line unit (III) via the upper busbar 28. In addition, the disconnect switch 20 connected to the current transformer 18 and the disconnect switch 22 connected to the current transformer 19 are not connected by the busbar. On the other hand, the transformer-line unit (II) and the busbar link line unit (III) adjacent to the busbar section line unit (IV) are connected by the lower busbar 29 (see FIG. 4-2). The busbar can be sectioned by providing the busbar section line unit in parallel with the upper side for the lower busbar 29 similarly to the upper busbar 28.

In FIG. 4-1, an interval between adjacent units is W. Therefore, the busbar can be sectioned by setting to W an interval between the two branch lead-out ports provided in the circuit breaker 16 of the busbar section line unit (IV) and connecting the units. The interval W between the adjacent units can generally be set to be different from the interval H between the branch lead-out ports shown in FIGS. 1 to 3. However, it is preferable to set W and H to the same length. When W and H are the same, the tank of the busbar link line circuit breaker can be used as the tank of the busbar section line circuit breaker.

A distance between the central axis of the circuit breaker 16 in the busbar section line unit (IV) and the central axis of the upper busbar 28 that is sectioned is $L_3$. $L_3$ is longer than $L_2$. Therefore, the operating device 17 provided on the upper side of the circuit breaker 16 in the busbar section line unit (IV) is arranged outer the line-side device provided in the transformer-line unit (II). In detail, the operating device 17 protruding to the transformer-line unit (II) side is arranged in a space provided on the lower side of the ground switch 12 shown in FIG. 2.

Figure 5:
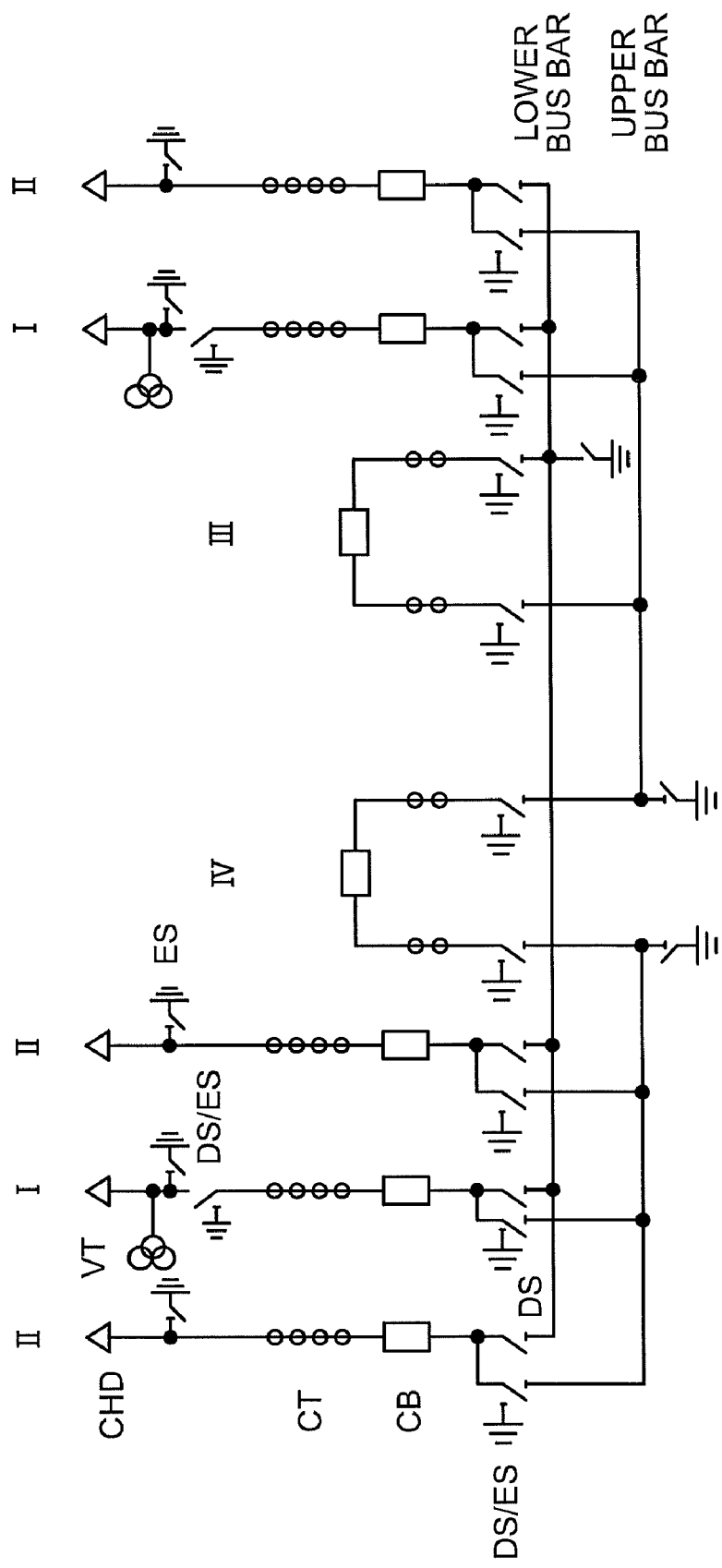
FIG. 5 is a single-line diagram of a configuration shown in FIG. 4-1 and FIG. 4-2.

FIG. 5 is a single-line diagram of the configuration shown in FIG. 4-1 and FIG. 4-2 and denotes a connection relation between units and upper/lower busbars. In FIG. 5, CHD denotes the cable head, CB denotes the circuit breaker, DS/ES denotes the disconnect switch having the ground switch, DS denotes the disconnect switch not having the ground switch, ES denotes the ground switch, CT denotes the current transformer, and VT denotes the voltage transformer.

Figure 6:
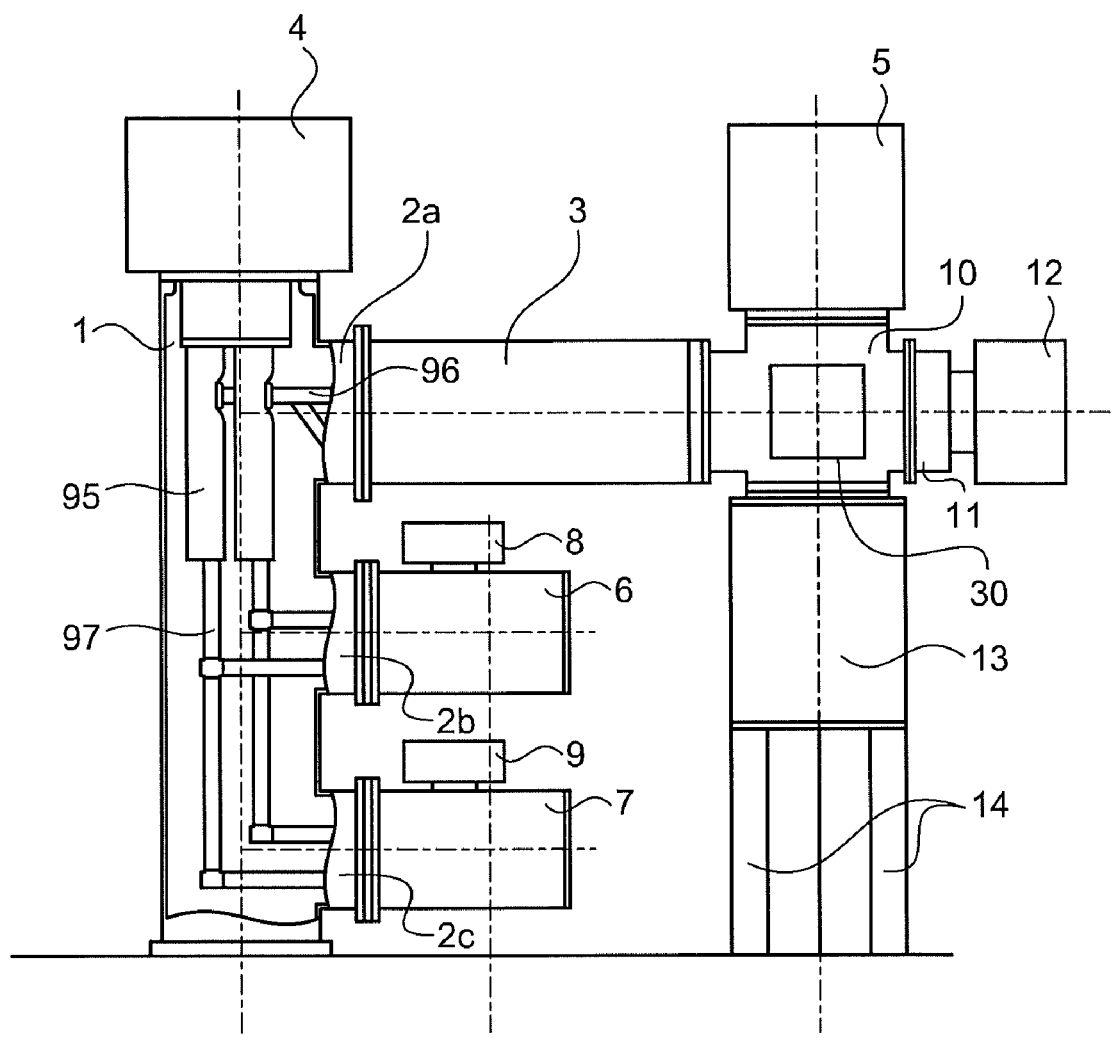
FIG. 6 is a cross-sectional view illustrating an internal structure of a circuit breaker in the power transmission/reception line unit shown in FIG. 1.

According to the present embodiment, as shown in FIGS. 1 to 3, the operating device of the circuit breaker is provided on the upper side of the circuit breaker. For example, in the power transmission/reception line unit shown in FIG. 1, the operating device 4 for operating the circuit breaker 1 is provided on the upper side of the circuit breaker tank. FIG. 6 is a cross-sectional view illustrating an internal structure of the circuit breaker in the power transmission/reception line unit shown in FIG. 1. As described above, according to the present embodiment, a portion connected to the line-side device is arranged at an upper side and a portion connected to the busbar-side device is arranged at a lower side. Moreover, a breaking unit 95 is provided on the upper portion of the circuit breaker 1 inside the circuit breaker tank. In other words, the breaking unit 95 is arranged near the operating device 4. As an effect of such an arrangement, because a distance between the breaking unit 95 and the operating device 4 gets short, the breaking unit 95 can be miniaturized. The breaking unit 95 has a shape of which a longitudinal direction is a cylindrical-shaft direction of the circuit breaker tank. A line-connection conductor 96 connected to the lateral side of the upper side of the breaking unit is drawn from the branch lead-out port 2a in the diametrical direction of the circuit breaker tank and is connected to the line-side device. Moreover, a busbar-connection conductor 97 is connected to the lower end of the breaking unit 95. The busbar-connection conductor 97 is extended downward. Then, the busbar-connection conductor 97 is curved in a horizontal direction at two positions, which are the height position of the branch lead-out port 2b and the height position of the branch lead-out port 2c, (in detail, the busbar-connection conductor is branched in a horizontal direction at the height position of the branch lead-out port 2b), and is extended in the diametrical direction. Then, the busbar-connection conductor 97 is drawn from the branch lead-out ports 2b and 2c and is connected to the busbar-side devices. In the present drawing, the circuit breaker includes a plurality of breaking units because the gas insulated switchgear has, for example, a three-phase-package configuration. The present drawing illustrates that the breaking units respectively correspond to the three phases. Moreover, the operating devices of the circuit breakers in the units other than the power transmission/reception line unit also have the same arrangement configuration as that of the power transmission/reception line unit.

On the other hand, because it is preferable that the breaking unit be arranged near the operating device assuming that the operating device 4 of the circuit breaker 1 is arranged on the lower side of the circuit breaker tank, it is preferable that the breaking unit be arranged on the lower portion of the circuit breaker and be positioned to face the branch lead-out ports 2b and 2c (for example, see Patent Document 2). However, in such an arrangement configuration of the breaking unit, the busbar-connection conductor connected to the lower end of the breaking unit, particularly the busbar-connection conductor connected to the upper busbar is extended upward inside the circuit breaker tank and then is drawn from the branch lead-out port. Therefore, because the folding structure is formed inside the circuit breaker tank (for example, see FIGS. 1 and 9 in Patent Document 2), an internal structure of the circuit breaker tank becomes complicated and thus thinning of the circuit breaker tank becomes difficult.

Next, an effect of the present embodiment will be explained. According to the present embodiment, the circuit breaker of the power transmission/reception line unit includes the plurality of branch lead-out ports mutually provided at the regular interval (interval H). Moreover, the length of the circuit breaker of the busbar link line unit is shorter than that of the circuit breaker of the power transmission/reception line unit by one pitch (or the interval H). The circuit breaker of the busbar link line unit similarly includes the plurality of branch lead-out ports for busbar-side device connection mutually provided at the regular interval (interval H). Therefore, because the breaking unit can be connected to multiple busbars without providing the folding structure of the conductor connected to the breaking unit within the circuit breaker tank as in the conventional art disclosed in Patent Document 1, an internal structure of the circuit breaker tank is simplified. Furthermore, the circuit breaker tank can be thinned because it is not required to provide an insulation distance between the conductor and the circuit breaker tank.

Because the operating device of the circuit breaker is arranged on the upper side of the circuit breaker, the breaking unit is arranged near the operating device, namely in the upper portion of the circuit breaker inside the circuit breaker tank. Therefore, for example, unlike with the conventional art disclosed in Patent Document 2, an internal structure of the circuit breaker tank can be simplified and the circuit breaker tank can be thinned because conductors for connecting the breaking unit and the multiple busbars do not have the folding structure inside the circuit breaker tank.

Because the length of the circuit breaker of the busbar link line unit is short by one pitch, an installation space can be decreased and a manufacturing cost can be reduced.

As shown in FIG. 1 or FIG. 2, because the busbars are wired at the lower side of the current transformer 3 between the circuit breaker 1 and the line-side device in the power transmission/reception line unit, the length of unit is shortened in a longitudinal direction of the current transformer 3 to be arranged reasonably, and thus an installation space can be reduced.

The circuit breaker tank of the power transmission/reception line unit and the circuit breaker tank of the transformer-line unit use the same tank, the size and shape of the circuit breaker tank of the busbar link line unit are defined as described above, and the circuit breaker tank of the busbar link line unit is further utilized as the circuit breaker tank of the busbar section line unit. In this way, the standardization of the circuit breaker tank is realized for the plurality of line configurations. Thus, the standardization of the connection conductor inside the circuit breaker tank can also be realized.

According to the present embodiment, because L1<L2 as shown in FIG. 1, a space is provided between the busbar-side devices (for example, the disconnect switches 6 and 7) and the line-side device (for example, the cable head 13) of the power transmission/reception line unit. Such a space can be utilized as a maintenance space of the busbar-side device.

Because the circuit breaker of the busbar link line unit is arranged to face the circuit breaker of the power transmission/reception line unit while placing the multiple busbars therebetween, all units can be arranged without increasing an entire length of a substation and thus an installation space can be reduced. Furthermore, in the busbar link line unit, two current transformers can easily be provided in the circuit breaker. The circuit breaker of the busbar link line unit and the circuit breaker of the power transmission/reception line unit can be arranged at the same side of the multiple busbars. However, in this case, the increase of the entire length of the substation cannot be suppressed because the circuit breaker of the busbar link line unit is located farther away from the line-side device of the power transmission/reception line unit.

According to the present embodiment, because the circuit breaker 16 of the busbar section line unit (IV) is arranged on the same horizontal surface as that of the busbar that is sectioned, an electrically-conducting path of the busbar section line can reasonably be realized.

Moreover, the interval W between the units adjacent to each other is the same as the interval H between the branch lead-out ports provided in the circuit breaker tank of the busbar link line unit and the circuit breaker tank of the busbar link line unit is utilized as the circuit breaker tank of the busbar section line unit. Therefore, the circuit breaker tank can be shared.

Because L2<L3, the circuit breaker 16 of the busbar section line unit (IV) is arranged at the outer side of the line-side device of the transformer-line unit (II). Particularly, because the operating device 17 protruding to the transformer-line unit (II) side is arranged in a space provided on the lower side of the ground switch 12 shown in FIG. 2, the increase of an interval between the units can be suppressed. Moreover, because the circuit breaker 16 is arranged to face the circuit breaker 1 of the power transmission/reception line unit (I) while placing the multiple busbars therebetween, each unit can be arranged without increasing the entire length of the substation.

Although a multi-busbar system has been explained as an example in the present embodiment, the invention is not limited to this system and can also be applied to another busbar system.

Second Embodiment

Figure 7:
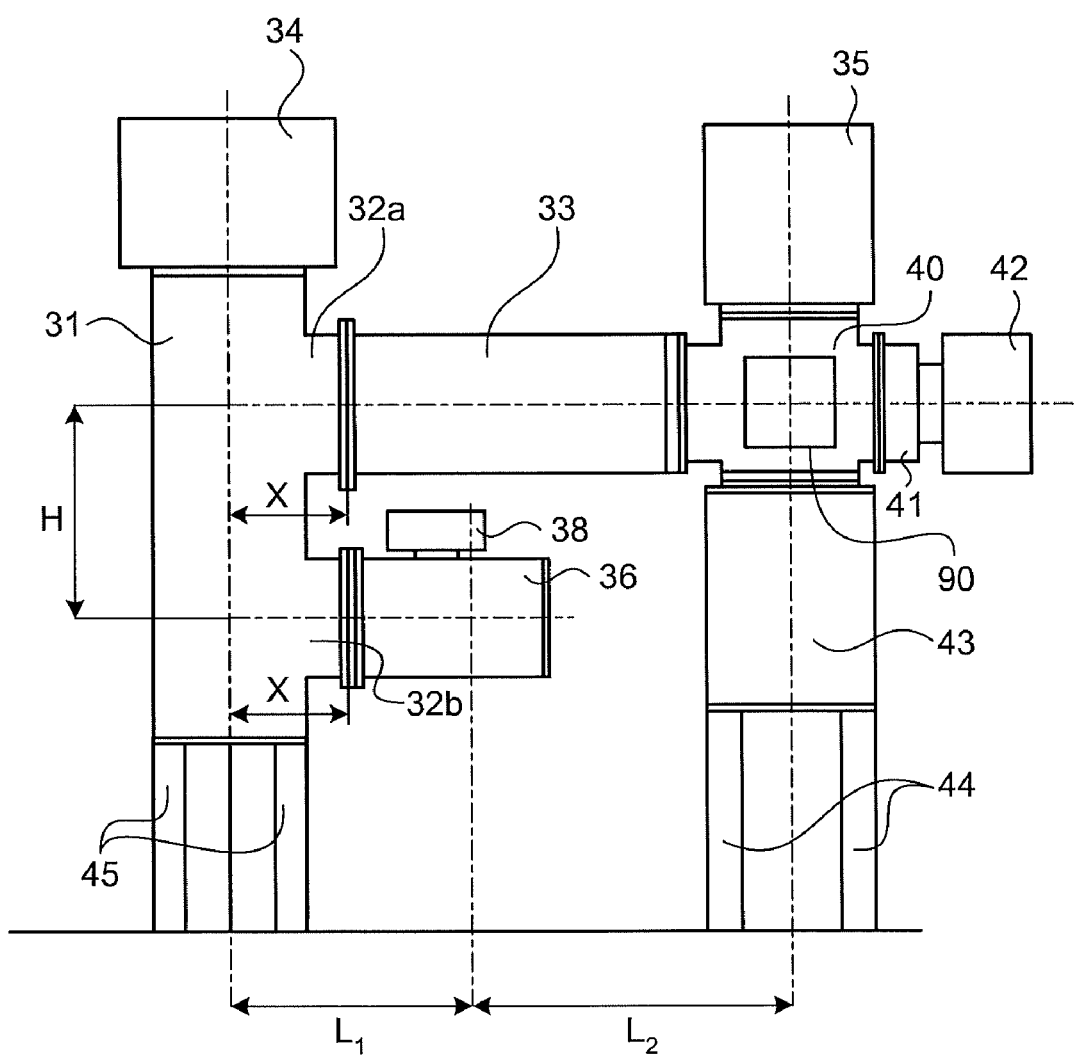
FIG. 7 is a cross-sectional view illustrating a configuration of a gas insulated switchgear according to a second embodiment and is a diagram illustrating a power transmission/reception line unit.
Figure 8:
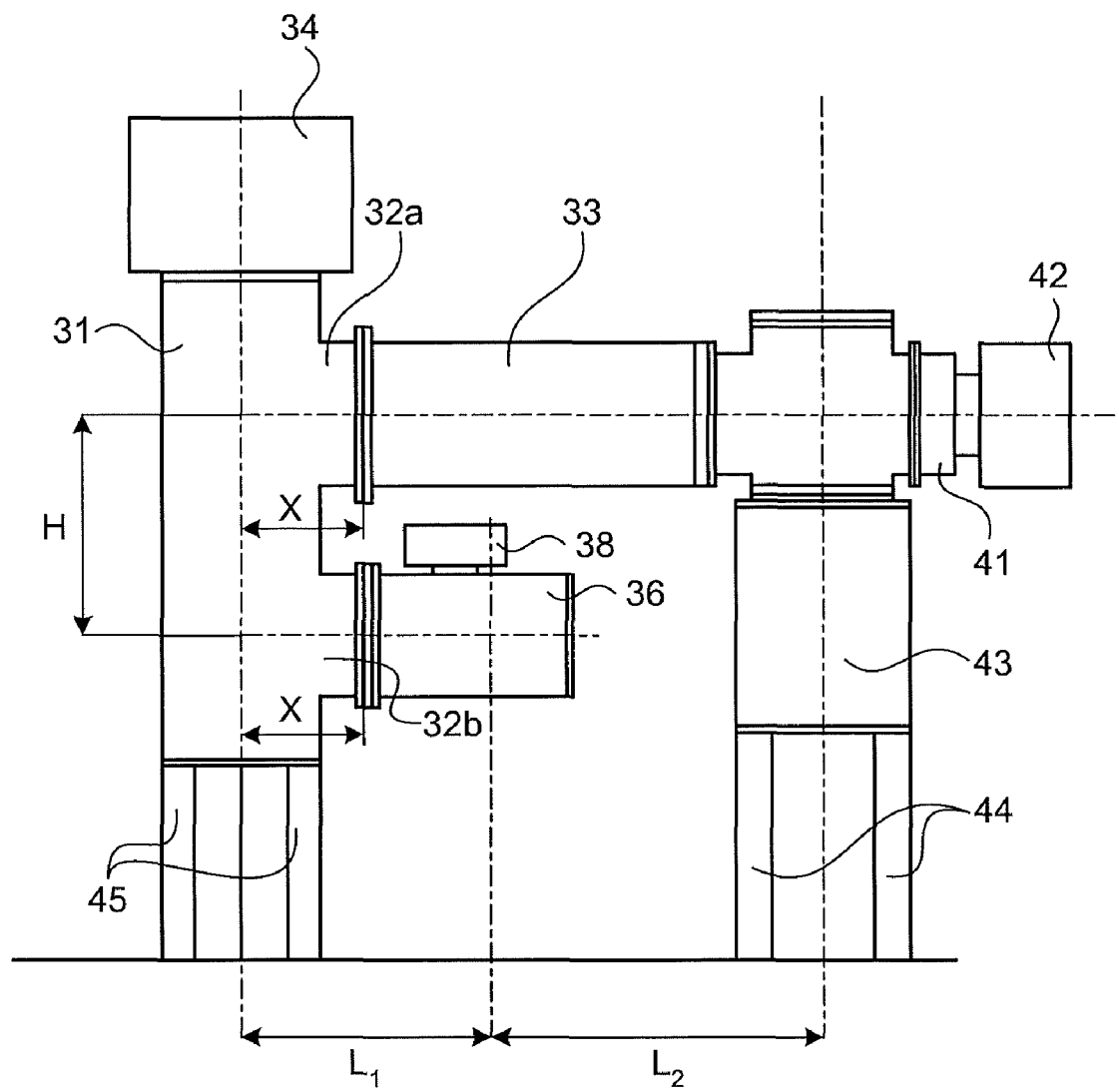
FIG. 8 is a diagram illustrating a transformer-line unit that is another configuration of the power transmission/reception line unit according to the second embodiment.

Although a multi-busbar system has been explained in the first embodiment, a single-busbar system will be explained in the second embodiment. FIG. 7 is a cross-sectional view illustrating a configuration of a gas insulated switchgear according to the second embodiment and is a diagram illustrating a power transmission/reception line unit. FIG. 8 is a diagram illustrating a transformer-line unit that is another configuration of the power transmission/reception line unit according to the second embodiment.

As shown in FIG. 7, the gas insulated switchgear includes a circuit breaker 31 having a breaking unit inside a cylindrical tank in which insulating gas is sealed. The circuit breaker 31 is a vertical-type circuit breaker in which a central-axis direction of the tank is perpendicular to an installation surface. The circuit breaker 31 is provided on a supporting base 45. Moreover, the gas insulated switchgear further includes an operating device 34 that is located at the upper side of the tank of the circuit breaker 31 and operates the circuit breaker 31.

Two branch lead-out ports 32a and 32b are provided on the later side of the tank of the circuit breaker 31. These are provided along a direction parallel to the central-axis direction of the tank. The branch lead-out port 32a is provided on the upper side of the branch lead-out port 32b at an interval H. Moreover, as an example, distances along the diametrical direction of the tank from the central axis of the tank to leading ends of the branch lead-out ports are the same as a distance X. A line-side device is connected to the branch lead-out port 32a and a busbar-side device is connected to the branch lead-out port 32b.

A disconnect switch 36 having a ground switch is connected to the branch lead-out port 32b. The disconnect switch 36 constitutes a disconnect switch integral with a busbar. An operating device 38 for operating a device is provided on the upper side of the disconnect switch 36. A busbar is connected to the disconnect switch 36 and is extended in a direction perpendicular to the drawing (not shown). Moreover, a current transformer 33 is connected to the branch lead-out port 32a provided on the upper side of the branch lead-out port 32b.

The gas insulated switchgear further includes a cable head 43, a disconnect switch 40, an operating device 90, a voltage transformer 35, a ground switch 41, and an operating device 42, so as to face the circuit breaker 31 while placing the busbar therebetween. The cable head 43 is provided on a supporting base 44. The disconnect switch 40 has a ground switch and is connected to the cable head 43. The operating device 90 operates the disconnect switch 40. The voltage transformer 35 is provided on the disconnect switch 40. The ground switch 41 for line-side ground is connected to the disconnect switch 40. The operating device 42 operates the ground switch 41. Moreover, the branch lead-out port 32a and the disconnect switch 40 are connected via the current transformer 33.

In FIG. 7, a distance $L_1$ from the central axis of the circuit breaker 31 to the central axis of the busbar penetrating the disconnect switch 36 is shorter than a distance $L_2$ from the central axis of the busbar penetrating the disconnect switch 36 to the central axis of the cable head 43. Therefore, a space between the busbar-side device and the line-side devices (particularly, the cable head 43 and the supporting base 44 for supporting the cable head) is formed.

Next, a configuration of the transformer-line unit according to the present embodiment will be explained with reference to FIG. 8. As shown in FIG. 8, the configuration of the transformer-line unit is the same as that of the power transmission/reception line unit shown in FIG. 7, except that the voltage transformer 35, the disconnect switch 40, and the operating device 90 shown in FIG. 7 are not provided. Therefore, in FIG. 8, the components that have the same functions as those of the components shown in FIG. 7 are denoted by the same reference numbers, and the explanations thereof are omitted.

Figure 9:
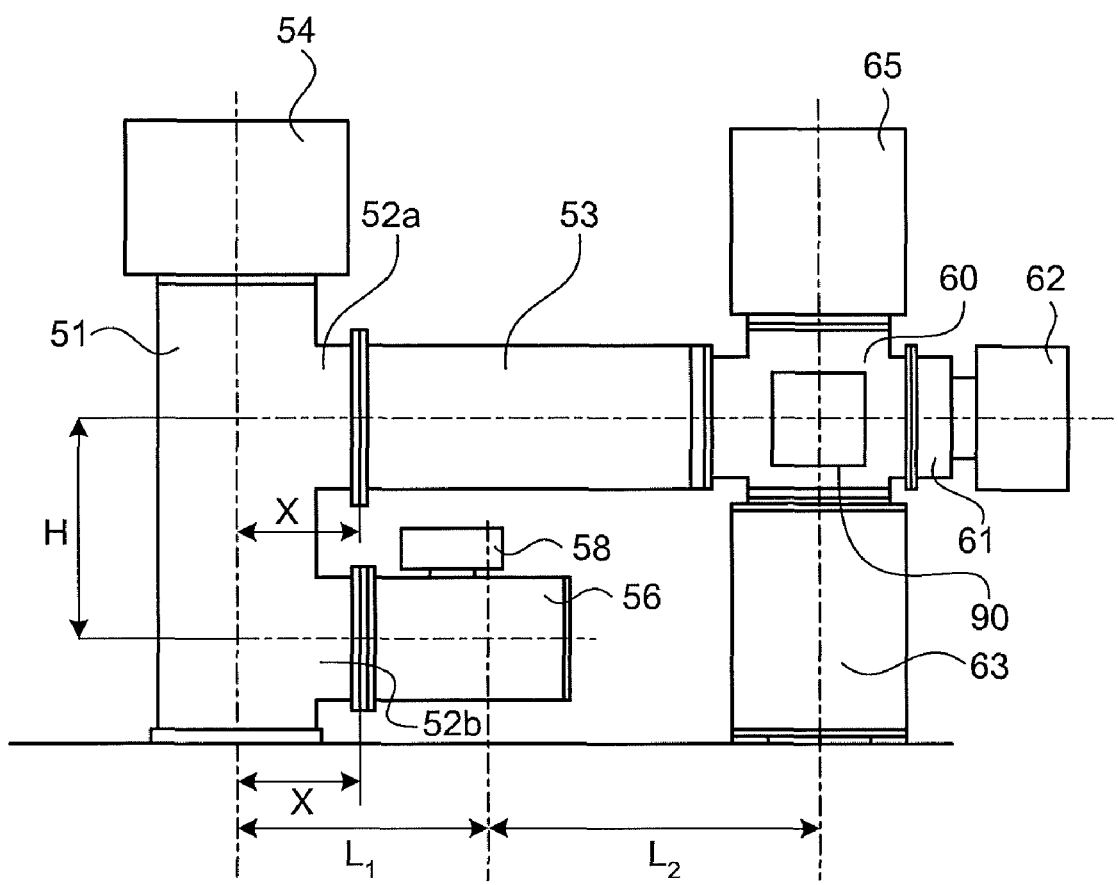
FIG. 9 is a cross-sectional view illustrating a configuration of the gas insulated switchgear according to the second embodiment and is a diagram illustrating a power transmission/reception line unit without a supporting base.
Figure 10:
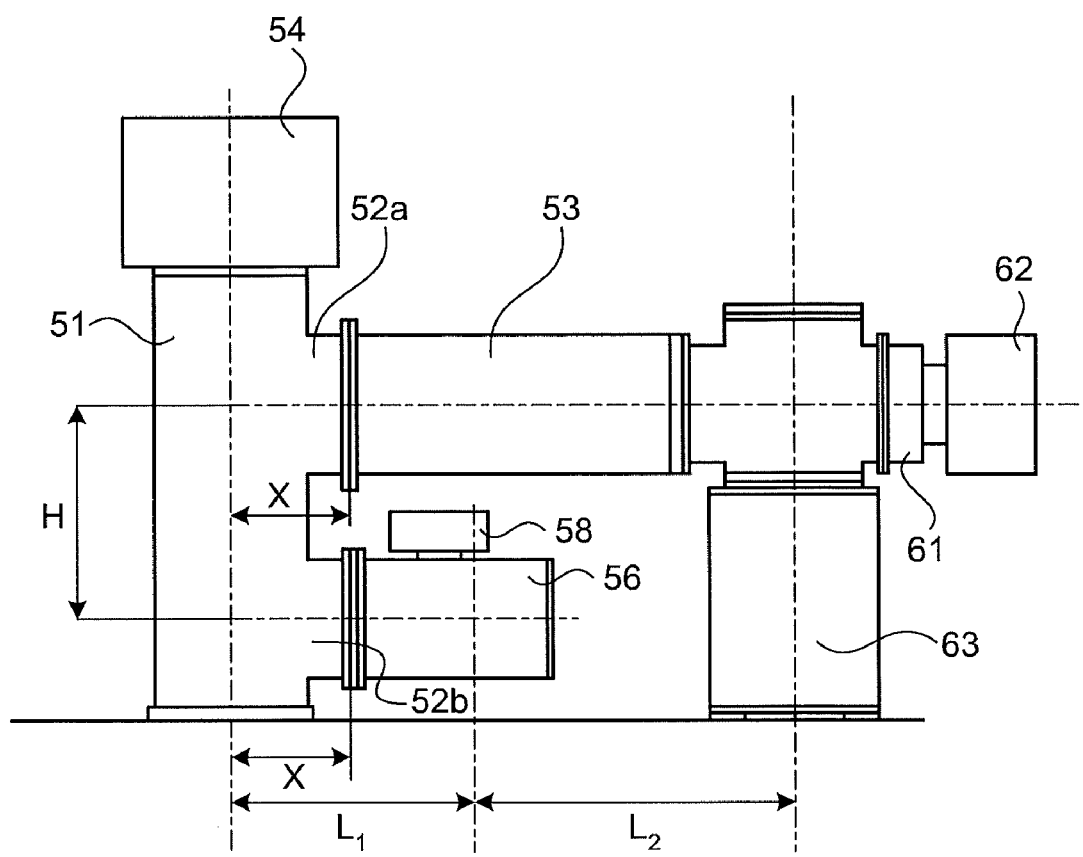
FIG. 10 is a diagram illustrating the transformer-line unit without the supporting base according to the second embodiment.

FIG. 9 is a cross-sectional view illustrating a configuration of a gas insulated switchgear according to the second embodiment and is a diagram illustrating a power transmission/reception line unit without a supporting base. FIG. 10 is a diagram illustrating a transformer-line unit without a supporting base according to the second embodiment.

As shown in FIG. 9, the gas insulated switchgear includes a circuit breaker 51 having a breaking unit inside a cylindrical tank in which insulating gas is sealed. The circuit breaker 51 is a vertical-type circuit breaker in which the central-axis direction of the tank is perpendicular to an installation surface. The gas insulated switchgear further includes an operating device 54 that is located at the upper side of the tank of the circuit breaker 51 and operates the circuit breaker 51.

Two branch lead-out ports 52a and 52b are provided on the later side of the tank of the circuit breaker 51. These are provided along a direction parallel to the central-axis direction of the tank. Moreover, the branch lead-out port 52a is provided at the upper side of the branch lead-out port 52b at an interval H. As an example, distances along the diametrical direction of the tank from the central axis of the tank to leading ends of the branch lead-out ports are the same as a distance X. A line-side device is connected to the branch lead-out port 52a and a busbar-side device is connected to the branch lead-out port 52b.

A disconnect switch 56 having a ground switch is connected to the branch lead-out port 52b. The disconnect switch 56 constitutes a disconnect switch integral with a busbar. An operating device 58 for operating a device is provided on the upper side of the disconnect switch 56. A busbar is connected to the disconnect switch 56 and is extended in a direction perpendicular to the drawing (not shown). Moreover, a current transformer 53 is connected to the branch lead-out port 52a provided on the upper side of the branch lead-out port 52b.

The gas insulated switchgear further includes a cable head 63, a disconnect switch 60, the operating device 90, a voltage transformer 65, a ground switch 61, and an operating device 62, so as to face the circuit breaker 51 while placing the busbar therebetween. The disconnect switch 60 has a ground switch and is connected to the cable head 63. The operating device 90 operates the disconnect switch 60. The voltage transformer 65 is provided on the disconnect switch 60. The ground switch 61 for line-side ground is connected to the disconnect switch 60. The operating device 62 operates the ground switch 61. Moreover, the branch lead-out port 52a and the disconnect switch 60 are connected via the current transformer 53.

In FIG. 9, a distance $L_1$ from the central axis of the circuit breaker 51 to the central axis of the busbar penetrating the disconnect switch 56 is shorter than a distance $L_2$ from the central axis of the busbar penetrating the disconnect switch 56 to the central axis of the cable head 63. Therefore, a space between the busbar-side device and the line-side device (particularly, the cable head 63) is formed.

Next, a configuration of the transformer-line unit that is not supported by a supporting base will be explained with reference to FIG. 10. As shown in FIG. 10, the configuration of the transformer-line unit is the same as that of the power transmission/reception line unit shown in FIG. 9, which is not supported by a supporting base, except that the voltage transformer 65, the disconnect switch 60, and the operating device 90 shown in FIG. 9 are not provided. Therefore, in FIG. 10, the components that have the same functions as those of the components shown in FIG. 9 are denoted by the same reference numbers, and the explanations thereof are omitted.

Figure 11:
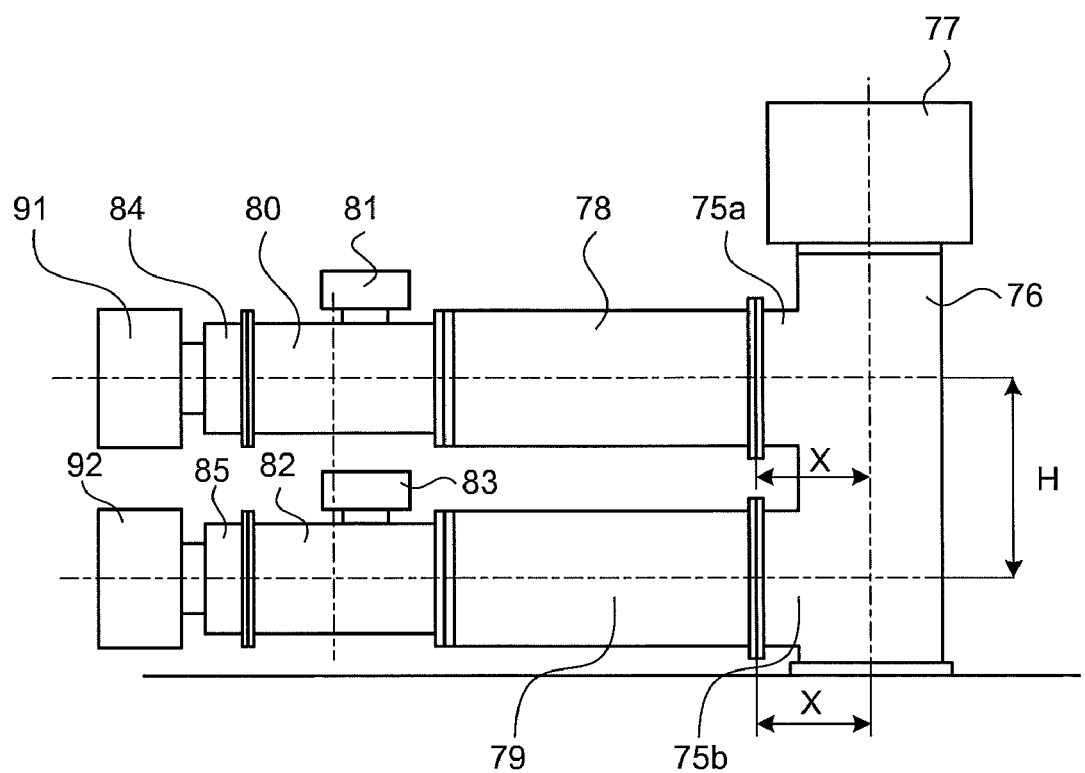
FIG. 11 is a cross-sectional view illustrating a configuration of the gas insulated switchgear according to the second embodiment and is a diagram illustrating a busbar section line unit.

FIG. 11 is a cross-sectional view illustrating a configuration of the gas insulated switchgear according to the second embodiment and is a diagram illustrating a busbar section line unit. As shown in FIG. 11, the gas insulated switchgear includes a circuit breaker 76 having a breaking unit inside a cylindrical tank in which insulating gas is sealed. The circuit breaker 76 is a vertical-type circuit breaker in which the central-axis direction of the tank is perpendicular to an installation surface. The gas insulated switchgear further includes an operating device 77 that is located at the upper side of the tank of the circuit breaker 76 and operates the circuit breaker 76.

Two branch lead-out ports 75a and 75b are provided on the later side of the tank of the circuit breaker 76. The branch lead-out ports 75a and 75b are provided along a direction parallel to the central-axis direction of the tank and an interval between the branch lead-out ports is the interval H similarly to that in FIGS. 7 to 10. Moreover, the branch lead-out port 75a is provided at the upper side of the branch lead-out port 75b. Distances along the diametrical direction of the tank from the central axis of the tank of the circuit breaker 76 to leading ends of the branch lead-out ports are X similarly to that in FIGS. 7 to 10. Busbar-side devices are respectively connected to the branch lead-out ports 75a and 75b.

A current transformer 79 is connected to the branch lead-out port 75b. A disconnect switch 82 having a ground switch is connected to the current transformer 79. The disconnect switch 82 constitutes a disconnect switch integral with a busbar. An operating device 83 for operating a device is provided on the upper side of the disconnect switch 82. A ground switch 85 for busbar ground and an operating device 92 for operating the ground switch 85 are provided at the other side (the side opposite to the connection side of the current transformer 79) of the disconnect switch 82. In this case, the current transformer 79, the disconnect switch 82, the ground switch 85, and the operating device 92 are connected to each other in a direction perpendicular to the central axis of the tank of the circuit breaker 76. The branch lead-out port 75a is connected to a current transformer 78. The current transformer 78 is connected to a disconnect switch 80 having a ground switch. The disconnect switch 80 constitutes a disconnect switch integral with a busbar. An operating device 81 for operating a device is provided on the upper side of the disconnect switch 80. A ground switch 84 for busbar ground and an operating device 91 for operating the ground switch 84 are provided at the other side (the side opposite to the connection side of the current transformer 78) of the disconnect switch 80. In this case, the current transformer 78, the disconnect switch 80, the ground switch 84, and the operating device 91 are connected to each other in a direction perpendicular to the central axis of the tank of the circuit breaker 76.

Figures 1, 12:
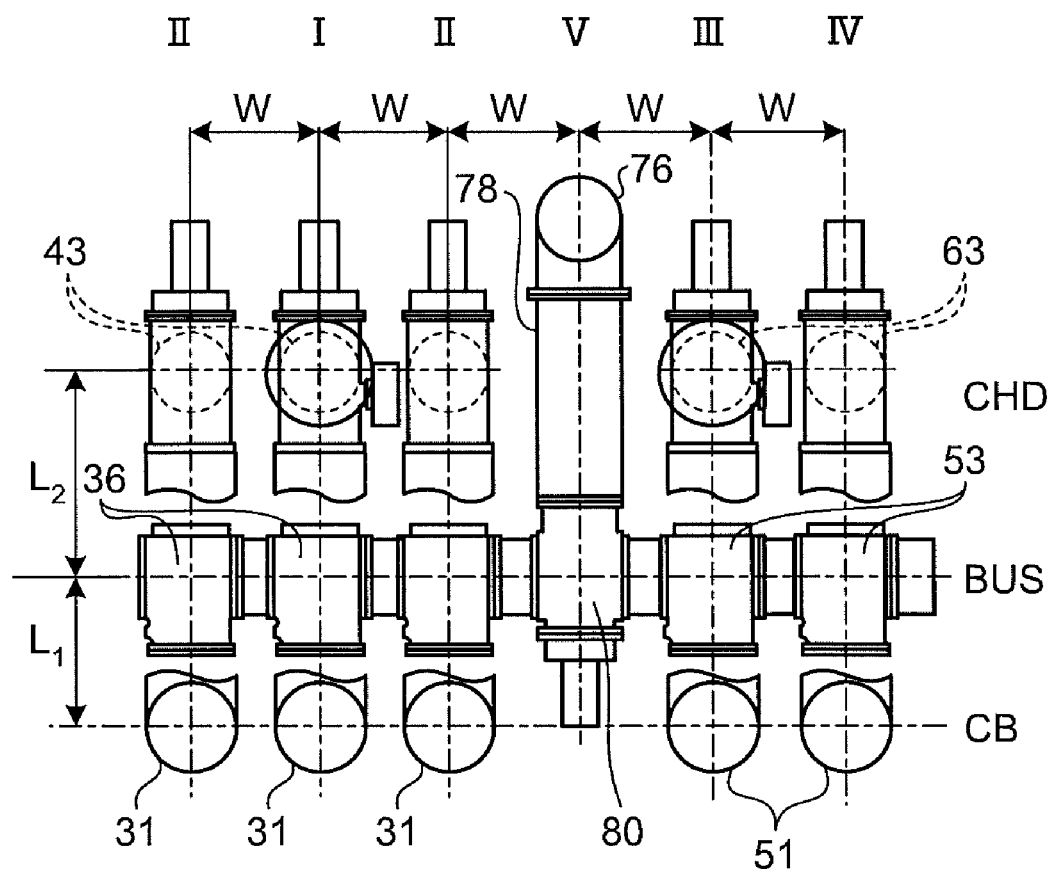
Figures 2, 12:
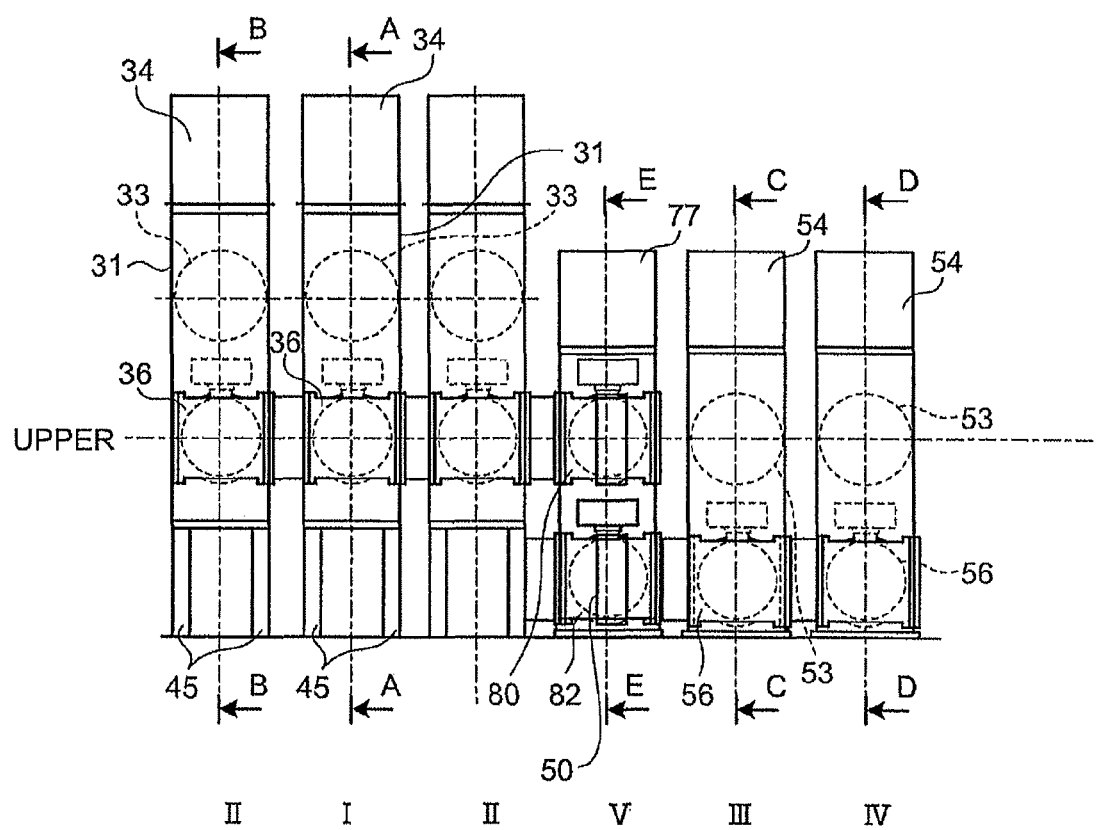

FIG. 12-1 is a plan view illustrating an example of an entire layout of a substation that is obtained by applying the second embodiment. FIG. 12-2 is a front view of the configuration shown in FIG. 12-1. In FIG. 12-1 and FIG. 12-2, the power transmission/reception line unit shown in FIG. 7 is denoted by I, the transformer-line unit shown in FIG. 8 is denoted by II, the power transmission/reception line unit without the supporting base shown in FIG. 9 is denoted by III, the transformer-line unit without the supporting base shown in FIG. 10 is denoted by IV, and the busbar section line unit shown in FIG. 11 is denoted by V. Moreover, in FIG. 12-2, an A-A line indicates the cross section shown in FIG. 7, a B-B line indicates the cross section shown in FIG. 8, a C-C line indicates the cross section shown in FIG. 9, a D-D line indicates the cross section shown in FIG. 10, and an E-E line indicates the cross section shown in FIG. 11. In FIG. 12-1 and FIG. 12-2, the components that have the same functions as those of the components shown in FIGS. 7 to 11 are denoted by the same reference numbers.

As shown in FIG. 12-1 and FIG. 12-2, the transformer-line unit (II), the power transmission/reception line unit (I), the transformer-line unit (II), and the busbar section line unit (IV) are arranged from left to right in sequence in the present drawing. The transformer-line unit (II), the power transmission/reception line unit (I), and the transformer-line unit (II) are connected to each other through a single busbar that is extended in a horizontal direction.

Furthermore, to the right from the busbar section line unit (V), the power transmission/reception line unit without the supporting base (III) and the transformer-line unit without the supporting base (IV) are arranged sequentially. The power transmission/reception line unit without the supporting base (III) and the transformer-line unit without the supporting base (IV) are connected to each other through another single busbar sectioned from the single busbar that is extended in a horizontal direction.

The circuit breaker 76 of the busbar section line unit (V) is a vertical-type circuit breaker and is provided to face the circuit breaker 31 of the power transmission/reception line unit (I) and the circuit breaker 51 of the power transmission/reception line unit (III) without the supporting base while placing the single busbar therebetween. The busbar section line unit (V) is not coupled to the supporting base. The shape of the circuit breaker 76 is the same as that of the circuit breaker 51 of the power transmission/reception line unit without the supporting base or the transformer-line unit without the supporting base.

The disconnect switch 82 of the busbar section line unit (V) and the disconnect switch 56 of the power transmission/reception line unit (III) without an adjacent supporting base are connected to each other through a single busbar. Moreover, the disconnect switch 80 of the busbar section line unit (V) and the disconnect switch 36 of the adjacent transformer-line unit (II) are connected to each other through another single busbar. In other words, each of the single busbar that is sectioned is connected to the upper disconnect switch and the lower disconnect switch of the circuit breaker 76. In order to realize such a configuration, it is required to match relationships between the heights of the supporting bases 44 and 45, the lengths of the circuit breakers, and the interval H between the branch lead-out ports. For example, the configuration of the present embodiment can be realized by uniforming the shapes of the tanks of the circuit breakers and setting the heights of the supporting bases 44 and 45 to the interval H. Such a configuration is preferable because the tank of the circuit breaker is standardized.

The circuit breaker of the busbar section line unit can be a horizontal circuit breaker similarly to the first embodiment even when using a single-busbar system. In other words, this configuration can be realized by constituting the units using the same-shape circuit breaker tanks without using a supporting base and arranging the circuit breaker of the busbar section line unit on the same horizontal surface as that of a single busbar. However, in such a configuration, although the size of the height direction can be suppressed because a base is not present, the length of the parallel direction of the unit gets long by one unit.

Figure 13:
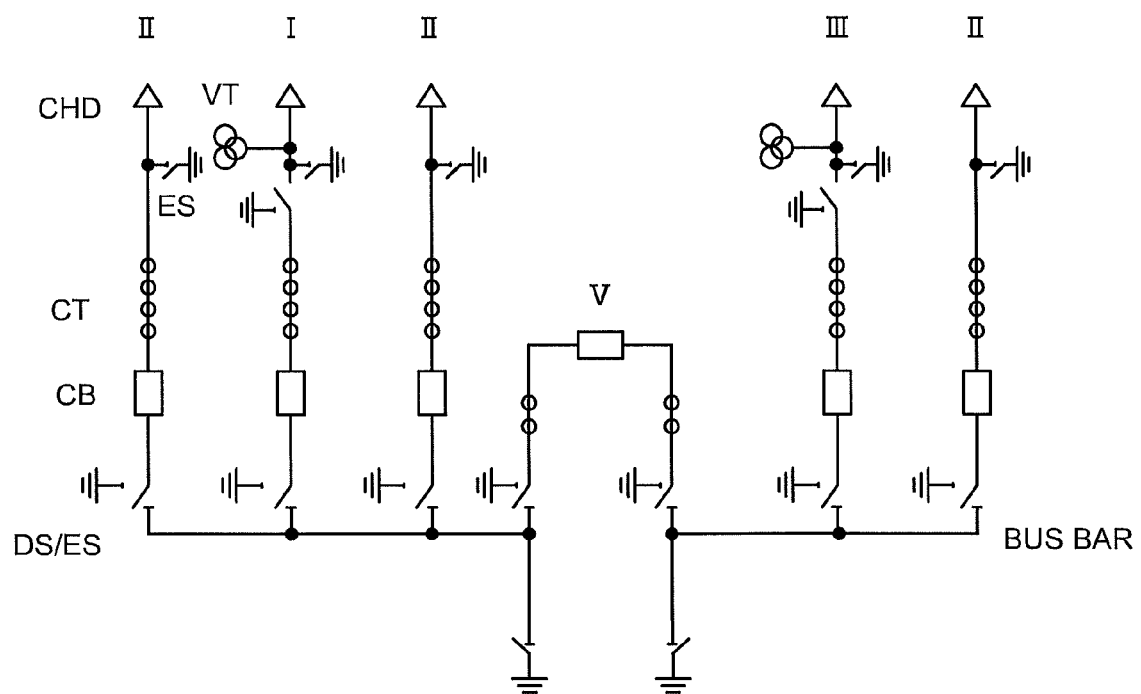
FIG. 13 is a single-line diagram of a configuration shown in FIG. 12-1 and FIG. 12-2.

FIG. 13 is a single-line diagram of the configuration shown in FIG. 12-1 and FIG. 12-2 and denotes a connection relation between units and a single busbar. In FIG. 13, CHD denotes the cable head, CB denotes the circuit breaker, DS/ES denotes the disconnect switch having the ground switch, ES denotes the ground switch, CT denotes the current transformer, and VT denotes the voltage transformer.

According to the present embodiment, it is possible to reduce the entire length of unit by using reasonable arrangement structure in which a single busbar is provided in a line.

Moreover, the length of the circuit breaker tank can be standardized in a plurality of line configurations. In this way, the connection conductor inside the circuit breaker tank can also be standardized.

According to the present embodiment, a space is provided between the busbar-side device and the line-side device of the power transmission/reception line unit, for example, by setting the relation between $L_1$ and $L_2$ to $L_1 < L_2$ as shown in FIG. 7. Such a space can be utilized as a maintenance space of the busbar-side device. Therefore, the units can be arranged without increasing an entire length of a substation even if the busbar section line unit exists in an adjacent unit.

In the first embodiment, the operating device of the circuit breaker is provided on the upper side of the circuit breaker. However, in the second embodiment of using a single-busbar system, the operating device is not limited to this configuration and can be provided on the lower side of the circuit breaker tank because the second embodiment does not relate to an effect obtained by providing the operating device on the upper side of the circuit breaker as explained in the first embodiment.

INDUSTRIAL APPLICABILITY

As described above, the gas insulated switchgear according to the present invention is suitable for reduction of total installation space in a substation.

The invention claimed is:

1. A gas insulated switchgear of multi-busbar system, comprising:
   a first circuit breaker for power transmission/reception line including
      a first circuit breaker tank of vertical-type, and
      a plurality of branch lead-out ports provided on a lateral side of the first circuit breaker tank and arranged at an interval H along a longitudinal direction of the first circuit breaker tank;
   a first busbar-side device for power transmission/reception line connected to each of branch lead-out ports other than an uppermost branch lead-out port of the branch lead-out ports provided in the first circuit breaker and a busbar;
   a line-side device connected to the uppermost branch lead-out port and arranged in opposite to the first circuit breaker across the busbar;
   a second circuit breaker for busbar link line including
      a second circuit breaker tank of vertical-type having a length shorter than that of the first circuit breaker tank by the interval H, and
      a plurality of branch lead-out ports provided on a lateral side of the second circuit breaker tank and arranged at the interval H along a longitudinal direction of the second circuit breaker tank; and
   a second busbar-side device for busbar link line connected to each of branch lead-out ports provided in the second circuit breaker.

2. The gas insulated switchgear according to claim 1, wherein
   an operating device of the first circuit breaker is provided on an upper side of the first circuit breaker, and
   an operating device of the second circuit breaker is provided on an upper side of the second circuit breaker.

3. The gas insulated switchgear according to claim 1, wherein the first circuit breaker and the second circuit breaker are arranged in opposite to each other across the busbar.

4. The gas insulated switchgear according to claim 1, wherein a distance between a center of the first circuit breaker and a center of the busbar is smaller than a distance between the center of the busbar and a center of the line-side device.

5. The gas insulated switchgear according to claim 4, wherein a space is provided between the first busbar-side device and the line-side device.

6. The gas insulated switchgear according to claim 1, further comprising:
   a third circuit breaker for busbar section line including
      a third circuit breaker tank arranged on a same lateral plane as that of a busbar that is sectioned, and
      a plurality of branch lead-out ports provided on a lateral side of the third circuit breaker tank and arranged at regular intervals along a longitudinal direction of the third circuit breaker tank; and
   a third busbar-side device for busbar section line connected to each of the branch lead-out ports provided in the third circuit breaker and the busbar that is sectioned, wherein
   the third circuit breaker and the first circuit breaker are arranged in opposite to each other across the busbar.

7. The gas insulated switchgear according to claim 2, further comprising:
   a third circuit breaker for busbar section line including
      a third circuit breaker tank arranged on a same lateral plane as that of a busbar that is sectioned, and
      a plurality of branch lead-out ports provided on a lateral side of the third circuit breaker tank and arranged at regular intervals along a longitudinal direction of the third circuit breaker tank; and
   a third busbar-side device for busbar section line connected to each of the branch lead-out ports provided in the third circuit breaker and the busbar that is sectioned, wherein
   the third circuit breaker and the first circuit breaker are arranged in opposite to each other across the busbar.

8. The gas insulated switchgear according to claim 3, further comprising:
   a third circuit breaker for busbar section line including
      a third circuit breaker tank arranged on a same lateral plane as that of a busbar that is sectioned, and
      a plurality of branch lead-out ports provided on a lateral side of the third circuit breaker tank and arranged at regular intervals along a longitudinal direction of the third circuit breaker tank; and
   a third busbar-side device for busbar section line connected to each of the branch lead-out ports provided in the third circuit breaker and the busbar that is sectioned, wherein
   the third circuit breaker and the first circuit breaker are arranged in opposite to each other across the busbar.

9. The gas insulated switchgear according to claim 4, further comprising:
   a third circuit breaker for busbar section line including
      a third circuit breaker tank arranged on a same lateral plane as that of a busbar that is sectioned, and
      a plurality of branch lead-out ports provided on a lateral side of the third circuit breaker tank and arranged at regular intervals along a longitudinal direction of the third circuit breaker tank; and
   a third busbar-side device for busbar section line connected to each of the branch lead-out ports provided in the third circuit breaker and the busbar that is sectioned, wherein the third circuit breaker and the first circuit breaker are arranged in opposite to each other across the busbar.

10. The gas insulated switchgear according to claim 5, further comprising:
a third circuit breaker for busbar section line including
a third circuit breaker tank arranged on a same lateral plane as that of a busbar that is sectioned, and
a plurality of branch lead-out ports provided on a lateral side of the third circuit breaker tank and arranged at regular intervals along a longitudinal direction of the third circuit breaker tank; and
a third busbar-side device for busbar section line connected to each of the branch lead-out ports provided in the third circuit breaker and the busbar that is sectioned, wherein
the third circuit breaker and the first circuit breaker are arranged in opposite to each other across the busbar.

11. The gas insulated switchgear according to claim 6, wherein
an interval between the branch lead-out ports provided in the third circuit breaker is same as the interval H, and
an interval between adjacent lines is same as the interval H.

12. The gas insulated switchgear according to claim 6, wherein
a distance between a center of the third circuit breaker and a center of the busbar that is sectioned is larger than a distance between the center of the busbar that is sectioned and a center of the line-side device, and
the circuit breaker for busbar section line is arranged on a side of the line-side device opposite to the busbar that is sectioned.

13. A gas insulated switchgear of single-busbar system comprising:
a first circuit breaker for power transmission/reception line including
a first circuit breaker tank of vertical-type, and
two branch lead-out ports provided on a lateral side of the first circuit breaker tank and arranged at an interval H along a longitudinal direction of the first circuit breaker tank;
a first busbar-side device for power transmission/reception line connected to a lower branch lead-out port of the two branch lead-out ports provided in the first circuit breaker and a busbar;
a line-side device connected to an upper branch lead-out port of the two branch lead-out ports provided in the first circuit breaker and arranged in opposite to the first circuit breaker across the busbar;
a second circuit breaker for busbar section line including
a second circuit breaker tank vertical-type, and
two branch lead-out ports provided on a lateral side of the second circuit breaker tank and arranged at the interval H along a longitudinal direction of the second circuit breaker tank; and
a second busbar-side device for busbar section line connected to each of the two branch lead-out ports provided in the second circuit breaker for busbar section line and a busbar that is sectioned.

14. The gas insulated switchgear according to claim 13, wherein a circuit breaker constituting one of two power transmission/reception line units on both sides of a busbar section line unit including the second circuit breaker with each busbar connected to each of the power transmission/reception line units sectioned by the busbar section line unit is provided on a base.

15. The gas insulated switchgear according to claim 13, wherein the first circuit breaker and the second circuit breaker are arranged in opposite to each other across the busbar.

16. The gas insulated switchgear according to claim 14, wherein the first circuit breaker and the second circuit breaker are arranged in opposite to each other across the busbar.

17. The gas insulated switchgear according to claim 15, wherein a distance between a center of the first circuit breaker and a center of the busbar is smaller than a distance between the center of the busbar and a center of the line-side device.

18. The gas insulated switchgear according to claim 17, wherein a space is provided between the first busbar-side device and the line-side device.

* * * * *